Figure 1:
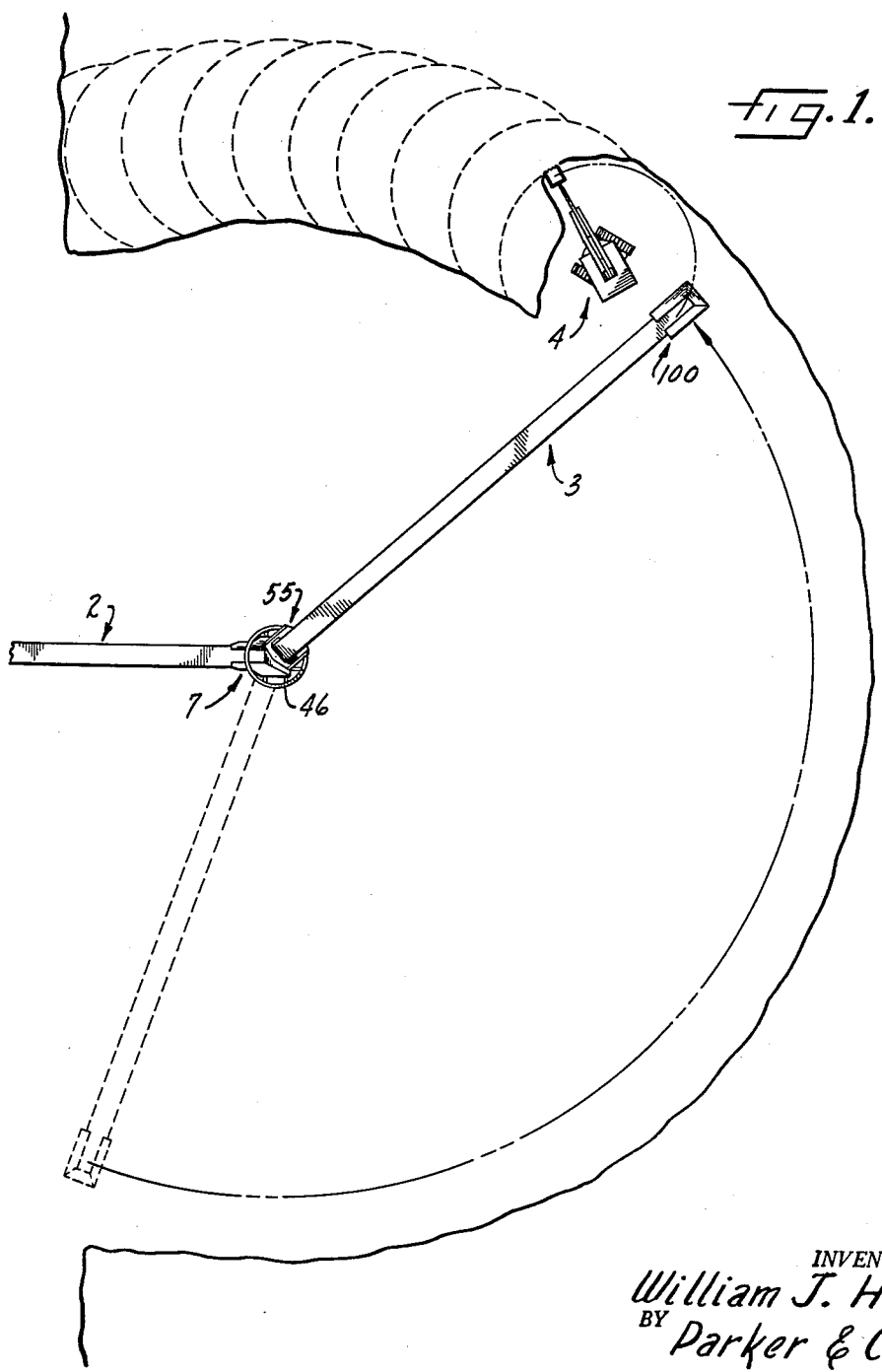

Oct. 15, 1963     W. J. HUBER     3,107,002
CONVEYOR SYSTEM FOR LARGE MATERIAL REMOVAL AREAS
Filed Aug. 29, 1960     4 Sheets-Sheet 1

INVENTOR.
William J. Huber,
BY Parker & Carter
Attorneys.

Oct. 15, 1963   W. J. HUBER   3,107,002
CONVEYOR SYSTEM FOR LARGE MATERIAL REMOVAL AREAS
Filed Aug. 29, 1960   4 Sheets-Sheet 3

INVENTOR.
William J. Huber,
BY Parker & Carter
Attorneys.

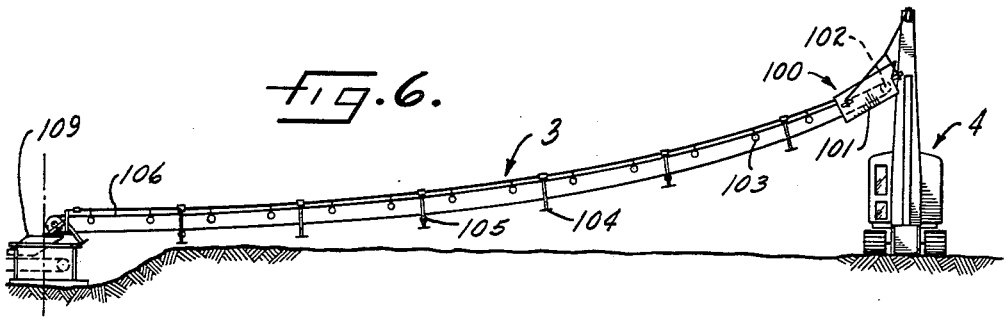
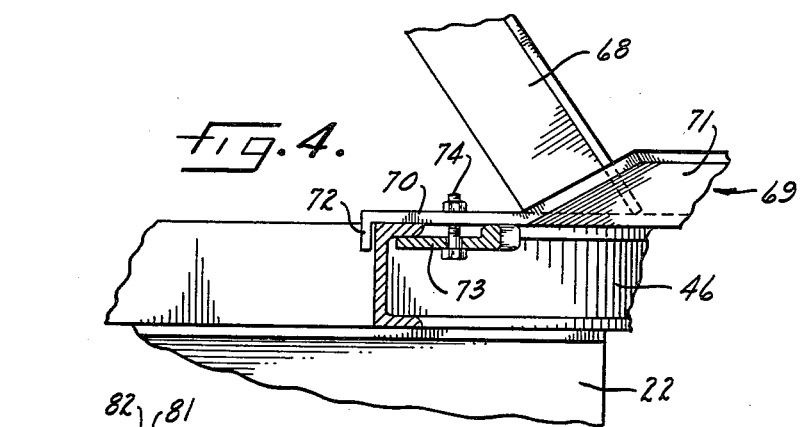
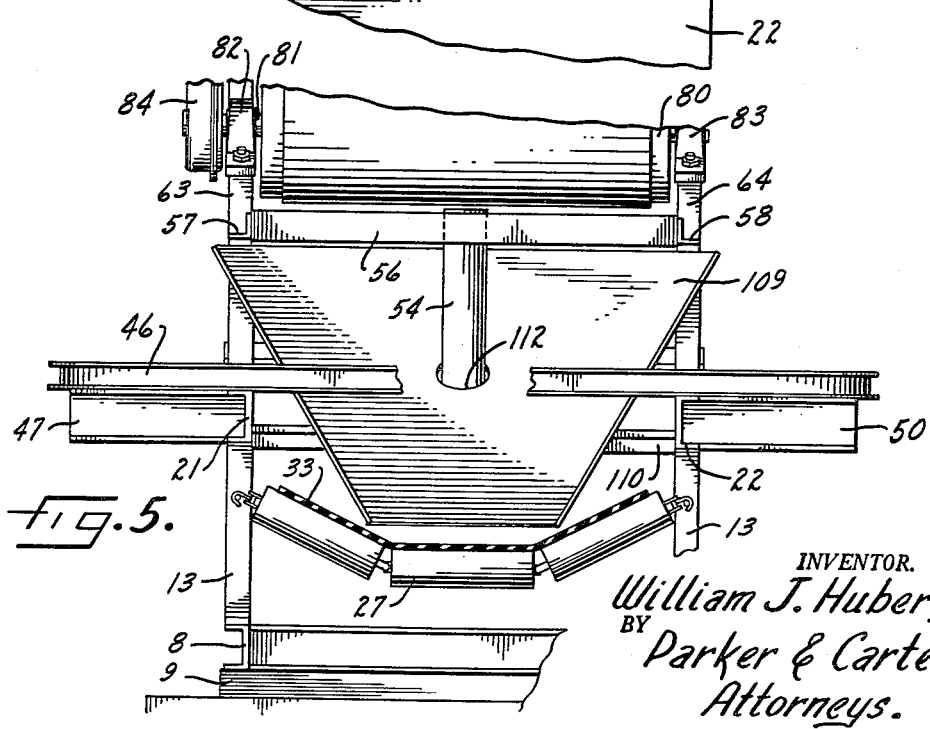

United States Patent Office 3,107,002
Patented Oct. 15, 1963

3,107,002
CONVEYOR SYSTEM FOR LARGE MATERIAL REMOVAL AREAS
William J. Huber, Oak Lawn, Ill., assignor to Goodman Manufacturing Company, Chicago, Ill., a corporation of Illinois
Filed Aug. 29, 1960, Ser. No. 52,619
5 Claims. (Cl. 198—95)

This invention relates in general to flexible belt conveyors and more particularly to a conveyor for moving material from a number of loading areas to a single discharge area with a minimum of labor and conveyor down time. It further relates to a method of handling material.

Often excavating or mining operations are continuously moved around within a limited area to follow a source of material. Ordinarily, a system of shuttle cars is used to carry material directly to a permanent discharge area, which might be a stacking device or a waiting truck, or to a fixed conveyor.

If a short auxiliary conveyor is employed to deliver material to a fixed conveyor, for example, it has heretofore required considerable labor and elapsed down time during a working shift to dismantle, move and reassemble it to follow the frequent and sometimes continual moves of the excavating or mining equipment.

Accordingly, it is a primary object of this invention to provide a gathering or auxiliary conveyor which can easily be moved to follow loading operations and is readily adjustable to local conditions.

Another object is to provide an improved method for delivering material from a number of loading areas to a fixed discharge area.

Still another object is to provide a fixed conveyor and a movable gathering conveyor which is efficiently handled by a minimum of personnel in a minimum of time.

Yet another object is to provide a flexible sideframe gathering conveyor which is anchored at its head end and can be moved through an arc of approximately 360 degrees by handling means at its tail end.

Another object is to provide a pivotally mounted flexible sideframe conveyor.

These and other objects of this invention will be found in the following specification and claims wherein like reference numerals identify like parts throughout.

Figure 2:
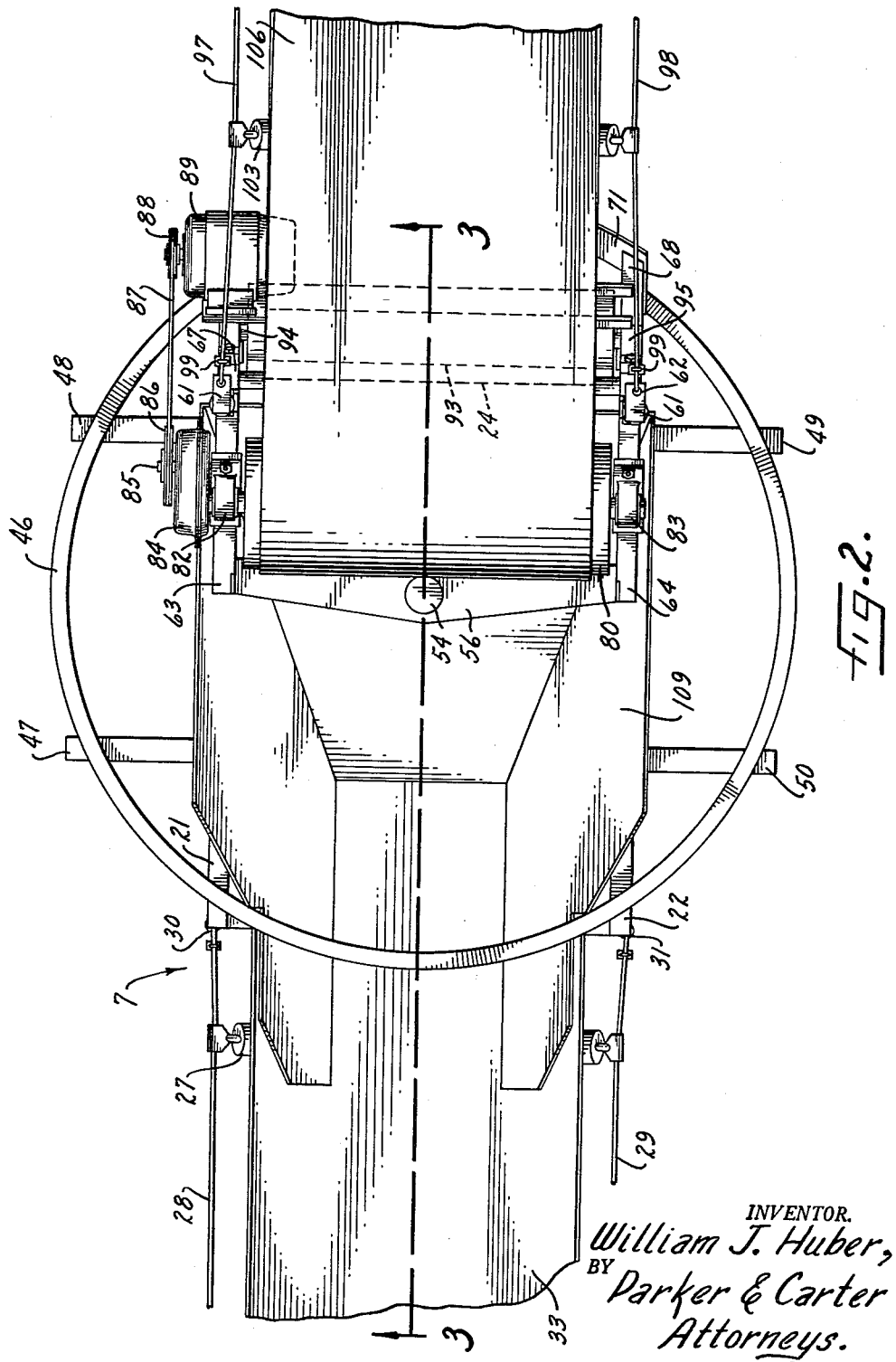
Figure 3:
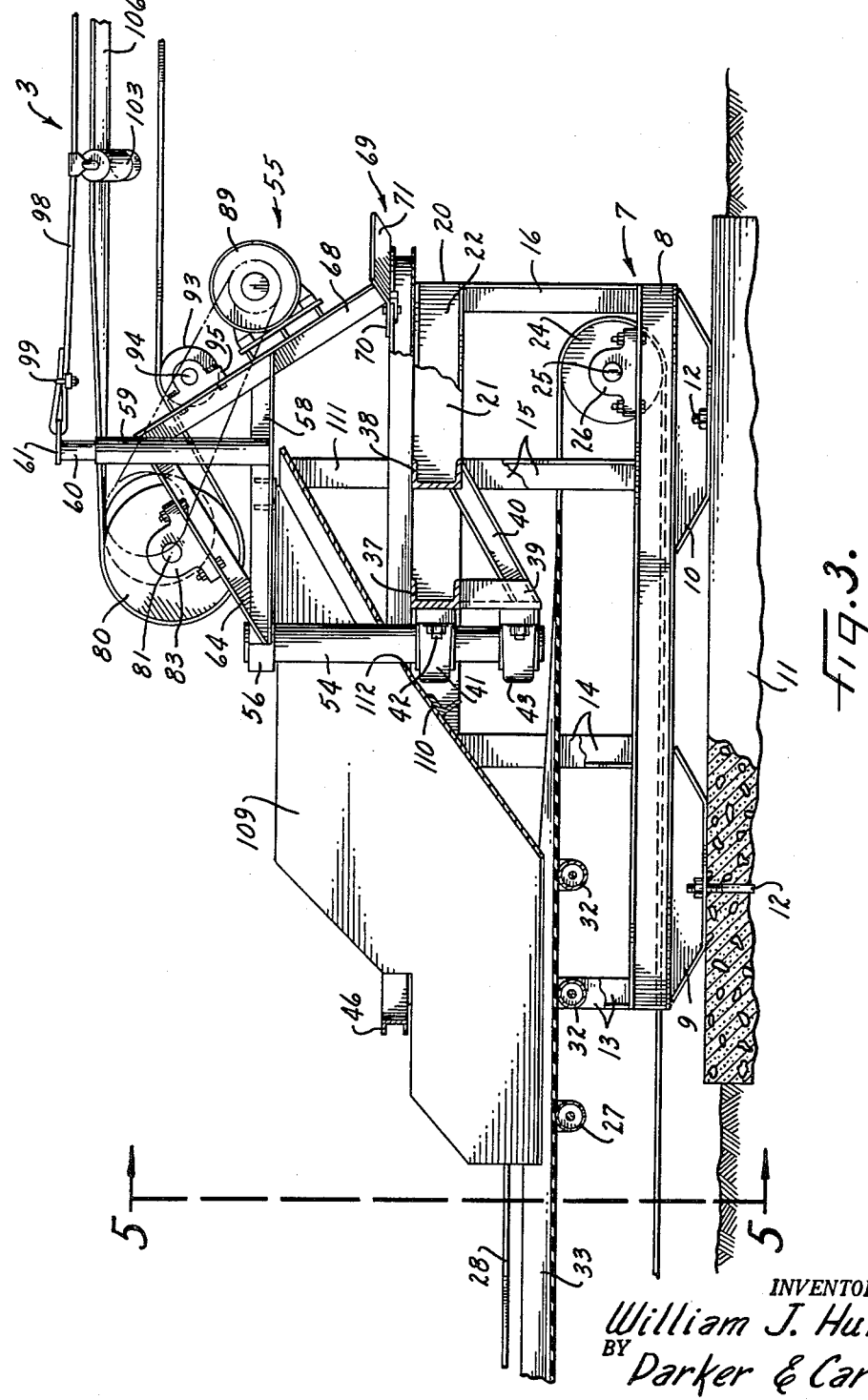

The invention is illustrated more or less diagrammatically in the following drawings wherein:

FIGURE 1 is a plan view of the fixed conveyor, its related gathering conveyor and the associated material-loading operation, FIGURE 2 is an enlarged plan view of the pivotal mounting of the gathering conveyor, FIGURE 3 is a view taken along line 3—3 of FIGURE 2, FIGURE 4 is an enlarged side view in partial section of locking means for the pivotally mounted head section of the gathering conveyor, FIGURE 5 is a view taken along line 5—5 of FIGURE 3, with parts broken away, and FIGURE 6 is a side elevation of the gathering conveyor as it is being moved to a new location.

In FIGURE 1, the system is shown set up in conjunction with a quarrying operation. A fixed conveyor, which might be a flexible sideframe or a rigid sideframe conveyor, is indicated generally at 2. It will be understood that the head or discharge end of the fixed conveyor 2, which is not shown in the drawings, is situated adjacent a stacking device or transporting means such as a truck. The gathering or auxiliary conveyor, indicated generally at 3, is pivotally connected at its head end to the tail end of the fixed conveyor 2, in a manner which will be hereinafter described, and extends to a position in which its tail section is in close proximity to a self-propelled loading device. In this instance the loading device is a conventional crane-type scoop, shown generally at 4.

The fixed conveyor 2 includes a tail section, indicated generally at 7, in FIGURE 3. The tail section comprises a horizontally disposed generally rectangular frame member 8 which is formed from connected channels. Pairs of laterally spaced skids 9 and 10 support the frame member 8 on an anchoring block 11. Anchoring bolts 12 secure the frame to the block. Pairs of laterally aligned and longitudinally spaced frame elements 13, 14, 15 and 16 extend upwardly from and are secured to opposite sides of the frame member 8. A horizontally disposed, generally U-shaped frame member 20 is secured on the upper ends of the frame elements 13, 14, 15 and 16 with the free ends of its longitudinally extending legs 21 and 22 supported by corresponding frame elements 13, as is best seen in FIGURE 5.

The tail section 7 carries an idler roller 24 rotatably mounted on transversely extending shaft seat 25. Shaft 25 is seated in pillow blocks 26 which might be adjustably secured to opposite sides of the frame member 8 adjacent upstanding frame elements 16 to provide conveyor belt take-up. Troughing idler assemblies 27 are suspended from longitudinally extending wire ropes 28 and 29 which are anchored to the tail section on upstanding frame elements 13, as at 30 and 31, respectively. As will be seen in FIGURE 3, additional idler assemblies, such as are shown at 32, might be suspended from the framework of the tail section 7 in any conventional manner. A conveyor belt 33 passes over idler roller 24 and is supported by idler assemblies 27 and 32 for travel between the tail section 7 and the head or discharge section of the conveyor (not shown).

A pair of laterally extending channel irons 37 and 38 connect the legs 21 and 22 of frame member 20 intermediate their ends. A transversely extending plate 39 depends from channel iron 37 and is rigidly supported by braces 40 extending between the plate and the channel iron 38. Bearing block 41 is mounted on transversely extending channel iron 37 by conventional means such as bolts 42. Bearing block 43 is mounted in a similar manner on the lower extremity of transversely extending plate structure 39.

A channel ring 46 overlies the frame member 20 and is rigidly secured thereto. The ring 46 is concentric with the bearing blocks 41 and 43. Laterally extending arms 47, 48, 49 and 50 project outwardly from corresponding legs 21 and 22 of frame member 20 and are secured to the periphery of the channel ring 46 in supporting relationship, as is best seen in FIGURE 2.

A pivot shaft 54 is carried by the bearing blocks 41 and 43. The shaft is fixed against longitudinal movement in the bearing blocks 41 and 43 by conventional internal bearing collars, not shown.

The gathering conveyor 3 includes a head section shown generally at 55 in FIGURE 3. The head section comprises transversely extending yoke members 56 fixed to the upper end of shaft 54 for rotation therewith. Horizontally disposed angle irons 57 and 58 are secured to the outer extremities of yoke 56 and extend rearwardly therefrom. An upwardly extending sleeve 59 is rigidly secured to each of the angle irons 57 and 58. A pipe member 60 is slidably received within the upper end of each sleeve 59 and is adjustably clamped relative thereto. Each pipe member 60 carries a horizontally disposed ear 61 fixed to its upper end. The ears 61 have apertures 62 extending through their free ends. Sleeves 59 are braced on one side by inclined brace members 63 and 64 fixed to the horizontally disposed angle irons 57 and 58 adjacent their juncture with yoke 56.

Inclined brace members 67 and 68 are secured between their ends to corresponding forwardly extending angle irons 57 and 58. The members 67 and 68 are fixed at their upper ends to a corresponding sleeve 59. Guide plates 69 are secured to the lower ends of the brace members 67 and 68. Each guide plate 69 has a lower flat surface 70 slidable on the upper flange of the channel ring 46 and an upwardly inclined extension 71. As will be seen in FIGURE 4, a hook or finger 72 extends downwardly from the flat surface 70 and snugly engages the base of the channel ring 46 in sliding relationship. L-clamp 73 is secured by bolt 74 to the flat portion 70 of plate 69 and underlies the upper flange of the channel ring 46.

Head section 55 of the gathering conveyor 3 supports a drive pulley 80. Pulley 80 is carried by transversely extending shaft 81 mounted for rotation in pillow blocks 82 and 83 secured in a conventional manner to inclined brace members 63 and 64, respectively. One end of shaft 81 extends into and forms the output shaft for a conventional reduction gear unit 84, seen best in FIGURE 2. Input shaft 85 carries a pulley 86 which is drivingly connected through a V-belt 87 to the drive pulley 88 of a conventional electric motor 89. Motor 89 is secured to the inclined brace 67 in any well-known manner. A snub pulley 93 extends between the inclined brace members 67 and 68 immediately above the electric motor 89 and is carried on a shaft 94 freely rotatable in pillow blocks 95 fixed to brace members 67 and 68.

The gathering conveyor 3 further includes a pair of longitudinally extending wire ropes 97 and 98 which pass through corresponding apertures 62 in ears 61 and are bent back and clamped by rope clamps 99. Wire ropes 97 and 98 extend between the head section 55 and a conventional tail section 100, best seen in FIGURE 6. They are clamped to tail section 100 for quick removal so that the gathering conveyor can be lengthened or shortened by paying out or reeling in wire rope carried by drums on the tail section in a well-known fashion. Tail section 100 includes a hopper 101 for receiving material and carries an idler roller 102. A series of generally regularly spaced troughing idler assemblies 103 are suspended between the wire ropes 97 and 98 in a conventional manner. H-frame support standards 104 are also secured to the wire ropes 97 and 98 and depend therefrom. Certain of the support standards 104 carry return rollers 105. The position of these return rollers is dictated primarily by the terrain.

A flexible conveyor belt 106 extends between the driven head pulley 80 on the head section 55 and the idler roller 102 at the tail section 100.

A hopper 109 overlies the tail end of the fixed conveyor belt 33 and underlies the driven head pulley 80 such that it is in a position to receive material from the head end of the gathering conveyor belt 106. The hopper 109 is fixed to a transversely extending support member 110 secured between legs 21 and 22 of the U-shaped frame member 20 and braced by vertically extending brace member 111 mounted on transversely disposed channel iron 38 secured therebetween. The hopper 109 has an aperture 112 extending therethrough, as is best seen in FIGURE 5. Rotatable shaft 54 extends upwardly through the aperture.

The use, operation and function of this invention are as follows:

The fixed conveyor 2 might be set up in a semi-permanent manner such that its tail section 7 extends into an open gravel pit, as seen in FIGURE 1. A gravel pit is used as an example, but it will be understood that the invention may be utilized in a quarry, open pit mine or merely a storage area. The conveyor 2 is illustrated as a flexible sideframe conveyor. The head section extends into a stacking device, truck loader or similar equipment (not shown).

The head section 55 of gathering conveyor 3 is mounted on the tail section 7 of fixed conveyor 2 for pivoting movement relative thereto. Yoke 56 pivots with shaft 54 in aligned bearing blocks 41 and 43. Plates 69 mounted at the lower ends of each of the inclined braces 67 and 68 are slidable on and supported by channel ring 46. It will thus be seen that a three-point support is provided for the head section of the gathering conveyor in any position into which it is pivoted. Pivoting movement through a 360 degree arc is thereby provided. L-shaped clamp 73 can be tightened or loosened at the discretion of the operator by manipulation of bolt 74 so as to lock the conveyor in any chosen position within its prescribed arc of movement.

The gathering conveyor belt 106 is driven by motor 89 through reduction gear 84. In any position of the gathering conveyor about its pivot point, the discharge end of the conveyor belt, at driven head pulley 80, overlies the hopper 109 such that any material being carried by the gathering conveyor will be deposited in the hopper and thence onto the conveyor belt 33 of the fixed conveyor 2.

The gathering conveyor might be anywhere from 20 to 300 feet long or even longer, depending upon the terrain in which it is utilized. As will be seen in FIGURE 6, when it is desirable that the gathering conveyor be moved to a different location, a crane or power shovel secured to the tail section 100 lifts the tail section and swings the gathering conveyor about pivot shaft 54. Clamps 73 are loosened before this pivoting movement takes place and tightened again after the gathering conveyor is repositioned. The local terrain, catenary droop of the gathering conveyor while it is being moved and height to which tail section 100 can be raised dictate the conveyor length which might be utilized. Sections can be added or removed as conditions dictate. When the gathering conveyor is placed on the surface again, tail section 100 is anchored in a conventional manner to draw the wire ropes 97 and 98 taut. It will thus be seen that the gathering conveyor can be operated, picked up and moved, and put back into operation again in a very short period of time with a minimum of labor.

A rapid and efficient method of handling material such as gravel or ore or the like is illustrated graphically in FIGURE 1 of the drawings. With the gathering conveyor 3 in the dotted line position of FIGURE 1, a quarrying operation or the like is carried on by power shovel 4 in close proximity to the tail section of the gathering conveyor. Material is rapidly delivered to the hopper 101 and carried along the conveyor belt 106 of the gathering conveyor 3 to fixed conveyor 2 and from there to a waiting truck or stacking device. As the power shovel 4 literally eats its way around in an arc, it can, at predetermined intervals, lift up the end of the gathering conveyor, as shown in FIGURE 6, and move it to another location immediately adjacent its new working area. The gathering conveyor can be shortened or lengthened to accommodate work closer or farther from the anchored head section thereof.

What has been shown and described is a practical and operative device for handling and conveying bulk material. Nevertheless, many changes might be made in size, shape, number and disposition of parts without departing from the spirit of the invention. In addition, a method of handling bulk material has been described and illustrated. The foregoing description is intended to be illustrative only, however, and not definitive and the scope of the invention should be limited only by the appended claims.

I claim:

1. A conveyor system for servicing large material removal areas in which wire rope sideframe retensioning time due to initiation of operation in a different location is substantially eliminated, said system, including, in combination, a removal conveyor, a wire rope sideframe gathering conveyor, said gathering conveyor having a length ranging from a convenient minimum up to a maximum which is substantially greater than the longest rigid frame conveyor of similar capacity capable of being bodily lifted at one end, the head end of said gathering conveyor being pivotally supported with respect to the removal conveyor, the head end of said gathering conveyor discharging into the tail end of the removal conveyor in all relative positions of the conveyors one to the other, the tail end of said gathering conveyor having structure engageable with lifting means whereby the gathering conveyor may be bodily moved, without dismantling, from a first to a second position by the application of a lifting and swinging force at its tail end, and repositioned at a new location with the wire rope sideframes under tension.

2. The conveyor system of claim 1 further characterized in that the gathering conveyor is swingable substantially 360 degrees about the removal conveyor.

3. The conveyor system of claim 1 further characterized in that the removal conveyor includes a frame supporting the tail end of said conveyor, said frame including a supporting guide ring member, a guide member engageable and movable with respect to the guide ring member, said guide member being integral with the head end of the gathering conveyor, and releasable means for locking the guide ring member to the guide member when the conveyors are properly positioned with respect to each other.

4. The conveyor system of claim 3 further characterized in that the guide ring member and the guide member are plates slidable with respect to one another.

5. The conveyor system of claim 3 further characterized in that the removal conveyor frame and the gathering conveyor carry a pivot post and pivot bearing means, said pivot post being carried by one conveyor and said pivot bearing means by the other conveyor, said pivot post being received in the pivot bearing means to thereby enable the meeting ends of the conveyors to be positioned at varying angles with respect to one another.

References Cited in the file of this patent

UNITED STATES PATENTS

| | | |
|---|---|---|
| 858,843 | Wilson | July 2, 1907 |
| 2,099,512 | Cartlidge | Nov. 16, 1937 |
| 2,641,353 | Weggum | June 9, 1953 |
| 2,851,151 | McCallum | Sept. 9, 1958 |